Sept. 11, 1962     E. R. GAERTTNER ET AL     3,054,099
BEACON DISTRESS SIGNAL

Filed Dec. 11, 1945     2 Sheets-Sheet 1

INVENTORS
ERWIN R. GAERTTNER
ROY G. HEATON

BY *M. A. Hayes*

ATTORNEY

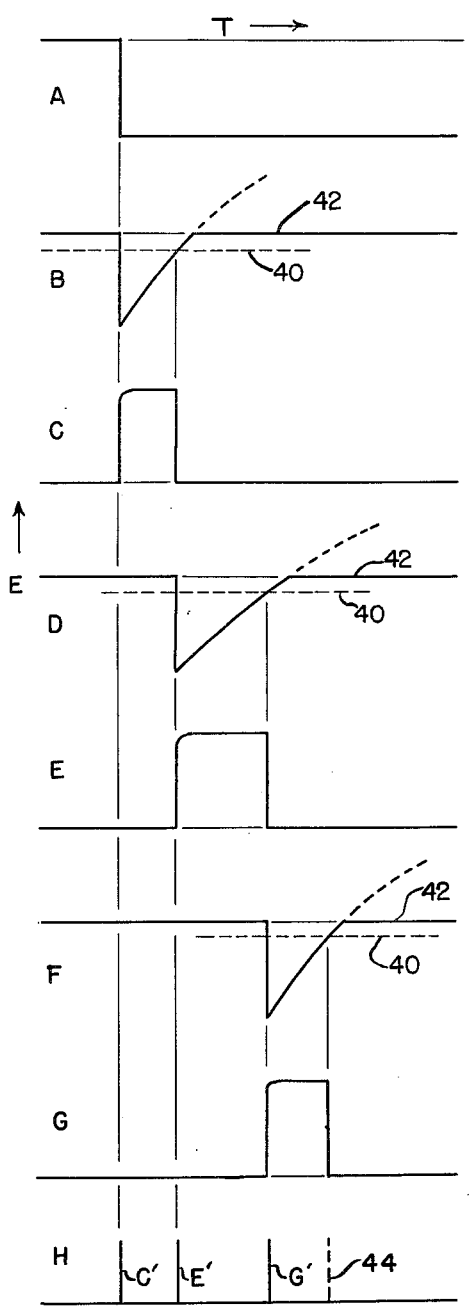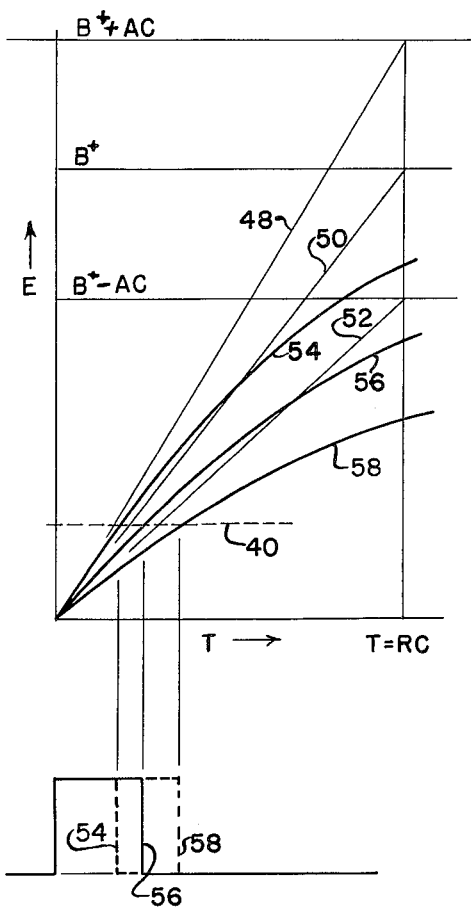

United States Patent Office 3,054,099
Patented Sept. 11, 1962

3,054,099
BEACON DISTRESS SIGNAL
Erwin R. Gaerttner, Belmont, and Roy G. Heaton, Cambridge, Mass., assignors, by mesne assignments, to the United States of America as represented by the Secretary of the Navy
Filed Dec. 11, 1945, Ser. No. 634,297
8 Claims. (Cl. 343—6.5)

This invention relates to coding circuits and more particularly, those for generating a series of spaced pulses.

Navigational problems for both aircraft and ships are greatly simplified by the use of what are known in the art as radar beacons. Pulse transmissions from the aircraft or ship excite the antenna of the transpondor, a pulse-type receiver-transmitter, used to receive the interrogating pulse from the pulse-echo system and to transmit automatically an identifying reply pulse or pulses. Thus, transpondors located at appropriate ground sites immediately identify these positions to the navigator by information presented on the cathode ray tube of the pulse-echo system. To eliminate navigational errors caused by associating an identification with the wrong location on a chart of beacon tarnspondors, and to prevent misuse of the system, it is customary to code the transpondor's reply. One type of coding known as range coding is commonly used. Each reply, caused by one interrogating pulse from the radar, consists of several pulses which will appear at different positions on the range sweep. A convenient circuit for generating range coded pulses is disclosed and claimed in the copending application of Conrad L. Longmire, Serial Number 566,165, filed December 1, 1944, entitled "Communication System," now abandoned.

Generally, several different coded responses are available at each transpondor, one of which may be reserved for use as a distress signal. In accordance with the present invention, however, a distress signal is provided having such an unusual display on the scope screen that it is immediately recognizable by the operator of the interrogating radar.

It is, therefore, the object of the present invention to provide a coding circuit which will produce a special, easily recognizable signal.

This and other objects will be more apparent upon consideration of the following specifications, taken in connection with the accompanying drawings forming a part thereof, in which:

FIGS. 4, 5A and 5B illustrate various wave forms occurring at different points in the electronic circuit of FIG. 1.

Figure 2:
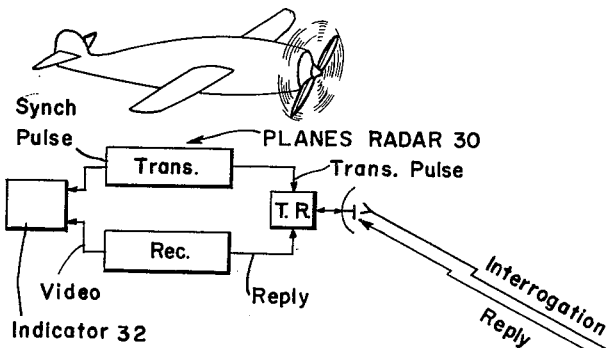
FIG. 2 is a sketch showing the relationship of the beacon and the interrogating radar.
Figure 3:
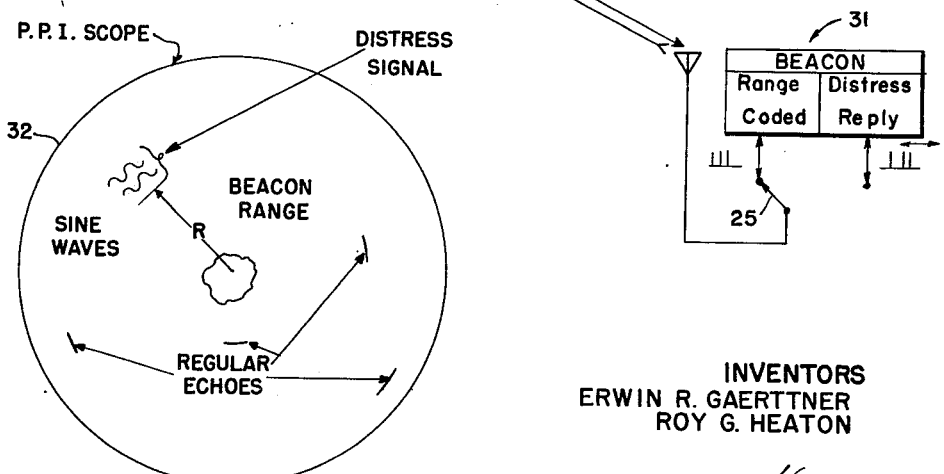
FIG. 3 is a showing of the face of the plan position indicator when normal replies are being returned from three sites and when a distress signal at range R is being sent from a fourth site.

To illustrate one kind of system in which the invention may be used, FIG. 2 portrays a plane whose radar 30 interrogates a beacon ground station 31. The beacon transpondor, upon receiving the radar's signal, transmits a range-coded response which radar 30 receives and presents on a cathode ray tube 32. The nature of the screen presentation obtainable is shown in FIG. 3.

Figure 1:
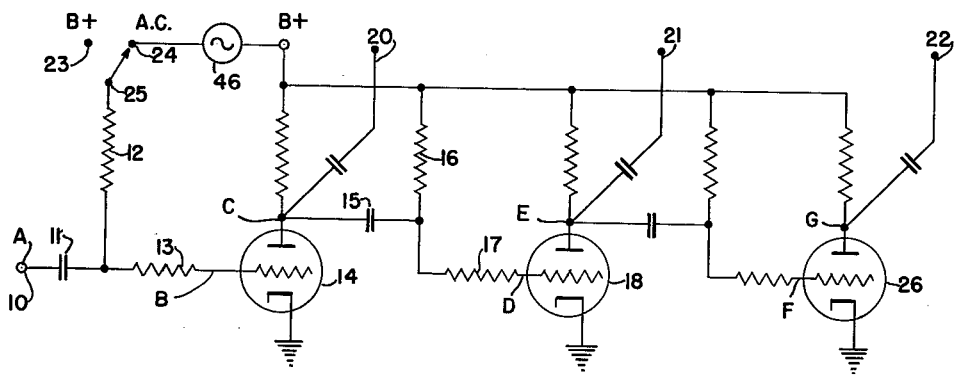
FIG. 1 is a schematic drawing of a coding circuit utilizing the present invention.

Referring next to FIG. 1, the circuit proposed by said Conrad L. Longmire, has been modified by the present invention to provide a special type of coding.

As here exemplified, the coder provides three consecutive delaying pulses, these pulses being generated by tubes 14, 18 and 26. The leading edge of the first pulse is fixed in time by the interrogating pulse, but the width of this pulse is caused to vary by a modulating alternating voltage signal. This variation changes the time position of the succeeding pulses. When used to determine the spacing between output R-F pulses in a range coded beacon, the resulting presentation on a PPI scope is a sine wave as shown on screen 32 in FIG. 3. This type of coding appears very conspicuously on the screen, and makes an effective distress signal.

The operation of the circuit is initiated by the negative gate of FIG. 4A applied at terminal 10. The letters A through G of FIG. 1 designate the points at which the waveforms of FIGS. 4A and 4G appear. The negative gate applied to the grid cuts off tube 14, thereby generating a positive pulse in the plate circuit as illustrated by FIG. 4C. As illustrated in FIG. 4B the potential on the grid of tube 14 drops below the cutoff potential of tube 14 which is represented in FIG. 4B by the dashed line 40. The potential on the grid of tube 14 will then start to rise exponentially with time toward the potential of switch 25 as capacitor 11 charges through resistor 12. There will be no voltage drop across grid limiting resistor 13 as long as the grid of tube 14 is negative with respect to the cathode of this tube. Since the cutoff time is a function of the rate at which capacitor 11 charges through resistor 12, the width of the positive output at the plate may be predetermined by varying the recovery time of the input differentiating circuit formed by resistor 12 and capacitor 11. It should be noted at this point that the recovery time may be varied in two different ways: by varying the time constant of capacitor 11 and resistor 12; or by varying the recovery voltage to which resistor 12 is tied. In FIG. 4C the positive gate at the plate of tube 14 is shown terminating at the time that the grid of tube 14 reaches cutoff. Actually the trailing edge of wave form 4C is slanted slightly as the potential on the grid of tube 14 rises from cutoff potential to cathode potential. However, the drop of potential at the anode of tube 14 is still very abrupt and any slanting of the trailing edge of the waveform at the anode of tube 14 will only serve to introduce a slight, constant and easily computed additional delay. The grid limiting resistor 13 connected between the grid of tube 14 and the junction of resistor 12 and capacitor 11 prevents the potential of the grid of tube 14 from rising above the potential of the cathode of this tube. Cathode potential is represented in FIG. 4B by the reference numeral 42. As the potential on the grid starts to rise above cathode potential, grid current will flow causing a voltage drop across resistor 13. Since the resistance of resistor 13 is large compared to the grid to cathode resistance of tube 14 any rise in potential at the junction of capacitor 11 and resistor 12 will appear across resistor 13 rather than across the grid to cathode resistance. Since the grid of tube 14 is intentionally driven below cutoff the amplifier circuit including tube 14 is usually referred to as an overdriven amplifier.

The positive pulse produced at the plate of tube 14 is differentiated by capacitor 15 and resistor 16 as shown in FIG. 4D. Due to the action of grid-limiting resistor 17, only the negative pip reaches the grid of tube 18. This pip cuts off the tube for a predetermined time, thereby producing a positive pulse at the plate, the leading edge of this pulse being coincident in time with the trailing edge of the pulse produced at tube 14. The action of capacitor 15 and resistors 16 and 17 corresponds to the action of capacitor 11 and resistors 12 and 13 previously described. Reference numerals 40 and 42 have again been employed to represent cutoff potential and cathode potential respectively.

This action is duplicated in tube 26, a positive pulse being produced at its plate, the leading edge of which is coincident with the trailing edge of the pulse produced at the plate of tube 18. The output pulses are taken off terminals 20, 21 and 22. It is obvious from the above that any number of pulses can be similarly formed. The output of this coder can be used as a timing basis for pulse modulating an R-F transmitter; i.e., the differentiated leading edge of each output pulse as shown as C′, E′ and G′ in FIG. 4H may be used to fire a modulator such as a blocking oscillator. It will be obvious from an examination of FIG. 4 that the delay introduced in the grid circuit of tube 26 plays no part in the spacing of pulses C′, E′ and G′. However, the output signal from the plate of tube 26 may be coupled to still another amplifier circuit with or without a delay in its input to produce still another output pulse 44 shown in FIG. 4H.

The circuit as just described provides for the generation of a conventional range-coded response from the transpondor. When desirable to transmit a distress signal, switch 25 is thrown so that resistor 12, normally connected to B+, is returned to a source 46 of alternating voltage, in the present embodiment a 150 volt, 400 cycle source. Source 46 is in turn connected to the source of plate supply potential designated by the symbol B+ to provide a direct voltage level for the alternating voltage.

By continuously varying the voltage toward which the control grid of tube 14 recovers, the width of the output pulse at 20 is continuously changing, and, therefore, the range position of the pulses formed at 21 and 22 continually changes. The leading edge of the pulse at 20 is unaffected, however, and the R-F pulse produced at this time affords the desired range information. FIG. 5 illustrates the manner in which changes on the voltage toward which capacitor 11 charges changes the time at which the second pulse is generated. In FIG. 5A the line B++AC represents the plate supply potential increased by the positive half cycle of the alternating voltage while the line B+−AC represents the plate supply potential decreased by the negative half cycle of the sine wave. In FIG. 5A lines 48, 50 and 52 represent the initial slopes of the rise in potential on capacitor 11. The actual exponential rise of capacitor 11 is illustrated by curves 54, 56 and 58. The times at which these curves cross the cutoff potential of tube 14, again represented by the dashed line 40, determine the time that tube 14 remains cutoff. FIG. 5B represents the variation in width of the signal at the plate of tube 14. The trailing edges of this waveform are designated as 54′, 56′ and 58′ to correspond with the waveforms 54, 56 and 58 of FIG. 5A. Such sine wave grid modulation causes the second and third code pips appearing on the screen of the pulse-echo system to trace actual sine waves on a PPI scope, as portrayed in FIG. 3. The number of sine wave cycles appearing on the scope depends upon the frequency of the grid modulation, and the scanning speed and beam width of the interrogating radar. As shown, the first code signal is not modulated and gives the range of the beacon from the interrogating radar.

Generalizing on the invention, the circuit has utility wherever it is desirable to modulate the spacing of a series of pips or pulses. This type of range modulation can be employed wherever the spacing is voltage controlled. It is believed that the construction and operation of our invention, as well as the advantages thereof, will be apparent from the foregoing description. It will be understood that while we have shown and described our invention in a particular embodiment, changes may be made in the circuits disclosed without departing from the invention, as sought to be defined in the following claims.

What is claimed is:

1. A coding circuit comprising a plurality of overdriven amplifier stages connected in cascade, each of said stages comprising an electron tube having at least a plate, a grid, and a cathode, said cathode being connected to a point of fixed reference potential, a source of plate potential, a first resistor coupling said plate to said source of plate potential, a second resistor coupled at one terminal to a second source of potential, a third resistor coupled between said grid and a second terminal of said second resistor, a capacitor coupled at a first terminal to said second terminal of said second resistor, the second terminal of said capacitor in the first stage of said cascade arrangement being coupled to a source of negative gate signals, the second terminal of said capacitor in stages following said first stage being coupled to said plate of the electron tube in the preceding stage, the signals at the plate of each of said stages and said negative gate signals being of sufficient amplitude to cause plate current cutoff in the stage to which they are applied, said second source of potential in at least one of said stages providing a varying voltage having a minimum value greater than the cutoff potential of the electron tubes in said stages, said second source of potential in the other of said stages providing a potential that is positive with respect to the cutoff potential of the electron tubes in the respective stages, and means coupled to said plate for extracting a signal from each of said overdriven amplifier stages.

2. A coding circuit comprising, a plurality of overdriven amplifier stages connected in cascade, each of said stages comprising, an electron tube having at least a plate, a grid and a cathode, said cathode being connected to a point of fixed reference potential, a source of plate potential, a first resistor coupling said plate to said source of plate potential, a second and third resistor, said third resistor being coupled between said grid and a first terminal of said second resistor, a capacitor coupled at a first terminal to said first terminal of said second resistor, the second terminal of said capacitor in the first stage of said cascade arrangement being coupled to a source of negative gate signals, the second terminal of said capacitor and stages following said first stage being coupled to said plate of said electron tube in the preceding stage, the signals at the plate of each of said stages and said negative gate signals being of sufficient amplitude to cause plate current cutoff in the stage to which they are applied, a second terminal of each of said second resistors in stages following the first stage being returned to a source of substantially constant potential, said potential being positive with respect to the cutoff poential of the electron tube in the respective stages, a second terminal of said second resistor in the first stage being connected to a two-position switch means, said switch means when in said first position coupling said second terminal of said second resistor to a source of substantially constant potential, said potential being positive with respect to the cutoff potential of the electron tube in said first stage, said switch when in a second position coupling said second terminal of said second resistor to a source of varying voltage, said varying voltage having a minimum value which is positive with respect to the cutoff potential of the electron tube in said first stage and means coupled to said plate for extracting a signal from each of said overdriven amplifier stages.

3. In a system for indicating at a first location the existence of a distress condition at a remote body, means at said body responsive to the reception of interrogating pulses transmitted from said first location for radiating during normal conditions coded pulse trains composed of a first pulse occurring in substantial time coincidence with the reception of said interrogating pulses and a second pulse spaced therefrom by a fixed predetermined amount, means at said body operative in the event of a distress condition for altering the characteristics of said coded pulse trains such that said first pulse continues to be radiated at the same relative time while said second pulse is cyclically displaced therefrom, and means at said first location for displaying said coded pulse trains.

4. In a system for providing an indication at a first station of the existence of a distress condition at a remote moving body, means at said body responsive to the reception of interrogating pulses transmitted from said first station for generating during normal conditions a coded pulse train composed of a first pulse in substantial time coincidence with the reception of said interrogating pulses and second and third pulses spaced therefrom by fixed predetermined amounts, means at said body operative in the event of a distress condition for modifying the characteristics of said coded pulse such that said second and third pulses are cyclically displaced in time with respect to said first pulses in response to the reception of successive interrogating pulses, a receiver at said first station for displaying said coded pulse trains, said receiver including a cathode ray tube having a rotary radial sweep operating in synchronism with the transmission of said interrogating pulses.

5. In combination with a radar system of the type wherein pulses of radio frequency energy are periodically radiated in a directional beam from a first location to detect the presence of reflecting targets, means for indicating at said first location the existence of a distress condition at said target, said means including means at said target responsive to the reception of radar pulses transmitted from said first location for radiating an identifying coded pulse train composed of a first pulse appearing in substantial time coincidence with the reception of said radar pulses and second and third pulses spaced therefrom by fixed predetermined amounts, means at said target operative in the event of a distress condition for cyclically varying the position of said second and third pulses, and receiving means at said first location for visually displaying said coded pulse trains.

6. A system as defined in claim 5 wherein said receiver includes a cathode ray tube having a rotary radial sweep synchronized with the transmission of said radar pulses whereby said identifying pulse train appears on the face of said cathode ray tube as first, second and third radially displaced arcuated traces with said first trace being removed from the center of the tube by an amount proportional to the range of said target and whereby said second and third traces are changed to sinusoidal traces when said distress condition exists at said target.

7. In a radar search system for identifying the presence of a particular target in a group of targets and for providing at a first location an indication of the existence of an abnormal condition at said particular target, means at said target responsive to the reception of radio frequency pulses transmitted from said location for transmitting during normal conditions an identifying coded pulse train composed of first, second and third fixedly spaced pulses, said first pulse occurring in a substantial time coincidence with the reception of said radio frequency pulses, means at said target operative in the event of an abnormal condition for altering the characteristics of said pulse train such that said first pulse continues to be transmitted at substantially the same relative time while said second and third pulses are cyclically displaced therefrom in response to the reception of successive pulses and a receiver at said location for displaying said coded pulse trains, said receiver including as a component thereof a cathode ray tube having a rotating radial sweep synchronized in operation with the transmission of said radar pulses whereby first, second and third radially displaced arcuated traces are displayed on the face of the cathode ray tube during normal times with the first trace being removed from the center of the tube by an amount proportional to the range of said target and whereby during abnormal conditions said second and third arcuated traces change their appearance to sinusoidal wave traces.

8. In combination, means at a first location for directionally transmitting pulses of radio frequency energy, means at a target responsive to the impingement of said pulses thereupon for transmitting an identifying pulse train composed of a plurality of pulses spaced by fixed predetermined amounts, means at said target operative in the event of an abnormal condition for altering the characteristics of said identifying pulse train such that at least one of said pulses is cyclically displaced in time with respect to a preceding pulse in response to the reception of succeeding radio frequency pulses, and means at said first location for displaying said coded pulse trains.

References Cited in the file of this patent
UNITED STATES PATENTS

| | | |
|---|---|---|
| 2,277,000 | Bingley | Mar. 17, 1942 |
| 2,368,197 | Brown | Jan. 30, 1945 |
| 2,380,520 | Hassler | July 31, 1945 |
| 2,402,916 | Schroeder | June 25, 1946 |
| 2,412,485 | Whitley | Dec. 10, 1946 |
| 2,424,481 | McCoy | July 27, 1947 |